(12) United States Patent
Su

(10) Patent No.: US 8,437,296 B2
(45) Date of Patent: May 7, 2013

(54) MOBILE TERMINAL AND METHOD FOR RETRIEVING MULTIMEDIA CONTENT

(75) Inventor: Chi-Chung Su, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 392 days.

(21) Appl. No.: 12/817,141

(22) Filed: Jun. 16, 2010

(65) Prior Publication Data

US 2011/0235594 A1  Sep. 29, 2011

(30) Foreign Application Priority Data

Mar. 23, 2010  (CN) .......................... 2010 1 0130469

(51) Int. Cl.
*H04W 4/00* (2009.01)

(52) U.S. Cl.
USPC ............. 370/329; 709/227; 709/226; 725/98; 725/119

(58) Field of Classification Search .................. 370/229, 370/230, 230.1, 232, 235, 236, 237, 310, 370/328, 329, 431, 437, 443, 444, 464; 455/550.1; 709/225–229; 725/81, 98, 105, 118–120, 725/148, 153
See application file for complete search history.

(56) References Cited

U.S. PATENT DOCUMENTS

| | | | | |
|---|---|---|---|---|
| 7,020,081 B1 * | 3/2006 | Tani et al. | ...................... | 370/230 |
| 7,453,844 B1 * | 11/2008 | Lee et al. | ...................... | 370/329 |
| 2004/0174853 A1 * | 9/2004 | Saito et al. | ...................... | 370/338 |
| 2009/0100003 A1 * | 4/2009 | Lahtinen | ........................... | 707/2 |
| 2009/0119589 A1 * | 5/2009 | Rowell et al. | ................. | 715/716 |

FOREIGN PATENT DOCUMENTS

TW  200629087  8/2006

* cited by examiner

*Primary Examiner* — Michael Thier
*Assistant Examiner* — Curtis A Alia
(74) *Attorney, Agent, or Firm* — Altis Law Group, Inc.

(57) ABSTRACT

A mobile terminal connects to a wireless access point (AP) connected to a web server to retrieve and display a list of uniform resource locators (URLs) corresponding to types of multimedia content stored in a multimedia server. Each URL includes a channel identifier allocated to a corresponding type of the multimedia content. After receiving a selection of one URL, the mobile terminal parses the selected URL to retrieve a channel identifier, and automatically switches to a channel corresponding to the channel identifier. The mobile terminal connects to a wireless AP on the channel to retrieve a corresponding type of the multimedia content from the multimedia server.

5 Claims, 3 Drawing Sheets

MOBILE TERMINAL AND METHOD FOR RETRIEVING MULTIMEDIA CONTENT

BACKGROUND

1. Technical Field

The disclosure relates to wireless communications, and particularly to a mobile terminal retrieving multimedia content via a wireless local area network.

2. Description of Related Art

Wireless local area networks (WLANs) are used in public locations, such as stadiums, to connect mass multimedia servers that provide Internet access for the public. However, the WLANs have limited network bandwidth. Thus, if a plurality of WLAN terminals are connected to the same wireless access point simultaneously accessing different types of multimedia content, the wireless access point may be overloaded, which results in a poor quality of multimedia traffic.

DETAILED DESCRIPTION

In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

Figure 1:
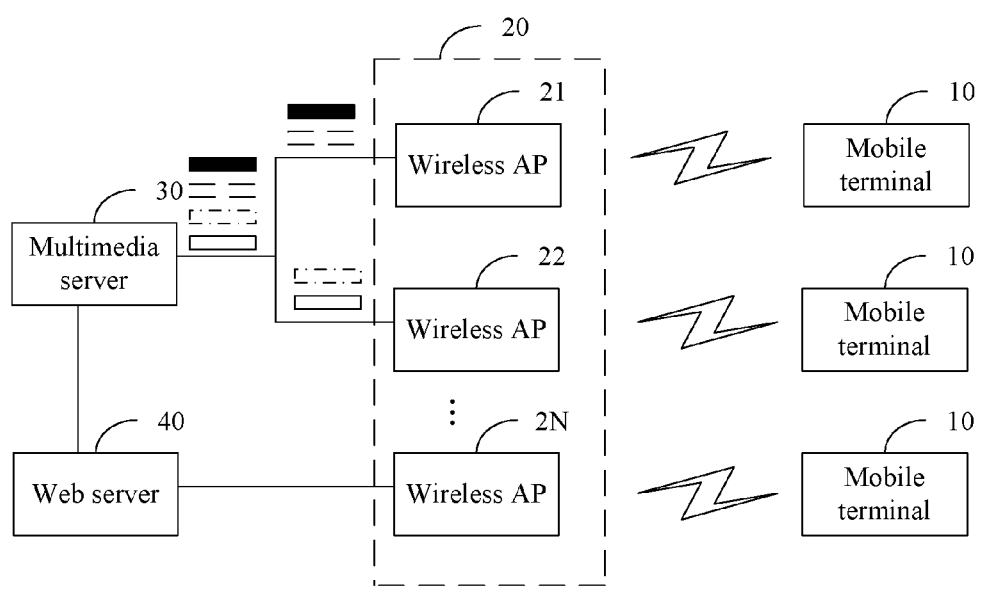
FIG. 1 is an application environment of an embodiment of a mobile terminal.

FIG. 1 is an application environment of an embodiment of a mobile terminal 10. In one embodiment, the mobile terminal 10 is a wireless communication product, such as, a mobile phone, a notebook computer, or a mobile Internet device, for example. In one exemplary embodiment, the mobile terminal 10 can be used in public location (e.g., a stadium) to supply multimedia services. The application environment may include a wireless local area network (WLAN) 20, a multimedia server 30, and a web server 40 in communication with the mobile terminal 10. The WLAN 20 includes a plurality of wireless access points (APs) 21, 22, . . . , 2N respectively, located on a first channel to a Nth channel, where N is a positive integer and is not bigger than 14. The wireless APs 21 to 2(N−1) are connected to the multimedia server 30 to provide multimedia connections. The wireless AP 2N is connected to the web server 40 to provide data connection. The multimedia connection and the data connection use different protocols, for example, the multimedia connection uses real-time transport protocol, while the data connection uses hypertext transfer protocol. The multimedia connection and the data connection are separated to reduce inter-influence to insure traffic quality.

The multimedia server 30 is connected to the web server 40, and stores different multimedia content, such as different real-time videos for sportscasts. In one embodiment, the multimedia server 30 allocates types of the multimedia content to different channels of the WLAN 20 for transmission, then integrates the allocated results, such as, channel identifiers, to uniform resource locators (URLs) corresponding to the types of the multimedia content, and publishes a list of the URLs on the web server 40. For example, as shown in FIG. 1, the multimedia server 30 stores four types of multimedia content. The first and second type of the multimedia content is allocated to a first channel for transmission, and the third and fourth types of the multimedia content is allocated to a second channel for transmission. If the mobile terminal 10 requires access to the first or second type of the multimedia content, the mobile terminal 10 needs to connect to the wireless AP 21 on the first channel. If the mobile terminal 10 requires access to the third or fourth type of the multimedia content, the mobile terminal 10 needs to connect to the wireless AP 22 on the second channel. In one embodiment, each of the URLs includes a channel identifier allocated to a corresponding type of the multimedia content. For example, if a URL of one type of the multimedia content is MDS:11//140.32.111.5/MLB/sportscast20021226, the number "11" is a channel identifier representing that the type of the multimedia content is allocated to an eleventh channel.

It should be understood that WLAN has a limited wireless range, when a mobile device is in the limited wireless range, the mobile device can communicate with the WLAN. The limited range is defined as "coverage area". In one embodiment, the WLAN 20 is set as the mobile terminal 10 entering coverage area of the WLAN 20 first connects to the wireless AP 2N on the Nth channel for providing data connection. Therefore, the mobile terminal 10 first connects to the wireless AP 2N to retrieve and display the list of the URLs corresponding to the types of the multimedia content from the web server 4, for user selection.

Figure 2:
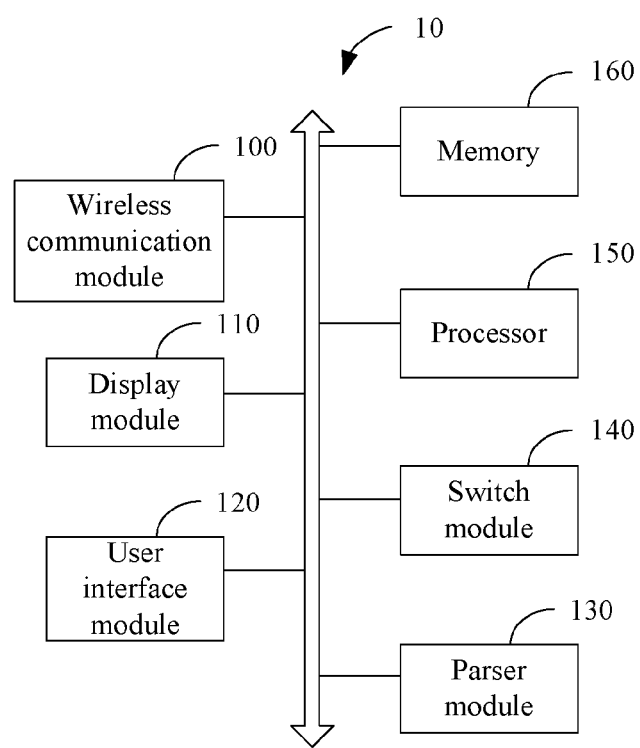
FIG. 2 is a schematic diagram of an embodiment of a mobile terminal as disclosed.

FIG. 2 is a schematic diagram of one embodiment of the mobile terminal 10 as disclosed. In one embodiment, the mobile terminal 10 connects to the wireless APs 21 to 2N to communicate with the multimedia server 30 and the web server 40 and retrieves and displays multimedia content. The mobile terminal 10 includes a wireless communication module 100, a display module 110, a user interface module 120, a parser module 130, and a switch module 140. The wireless communication module 100 communicates with the WLAN 20. When the mobile terminal 10 enters coverage area of the WLAN 20, the wireless communication module 100 connects to the wireless AP 2N on the Nth channel. Then the mobile terminal 10 communicates with the web server 40 to retrieve the list of the URLs corresponding to the types of the multimedia content stored in the multimedia server 30. If a user of the mobile terminal 10 wants to access a certain type of the multimedia content, the wireless communication module 100 connects to the wireless APs 21 to 2(N−1) to retrieve the certain type of the multimedia content from the multimedia server 30. In one embodiment, connections and communications between the wireless communication module 100 and the wireless AP 21 to 2N accord with the Institute of Electrical and Electronics Engineers (IEEE) 802.11a/b/g/n.

The display module 110 is connected to the wireless communication module 100, and displays the list of the URLs and the certain type of the multimedia content retrieved by the wireless communication module 100. The user interface module 120 receives a selection of one of the URLs. In one embodiment, the user interface module 120 may be a touch panel or a keypad allowing user to tap into one of the URLs to access a corresponding type of the multimedia content. In one embodiment, the display module 110 may be a display system.

The parser module 130 parses the selected URL, and retrieves a channel identifier from the selected URL. If the selected URL of a corresponding type of the multimedia content is MDS:11//140.32.111.5/MLB/sports-cast20021226, the parser module 130 parses the above URL, and retrieves "11" as the channel identifier.

The switch module 140 automatically switches the mobile terminal 10 to a channel corresponding to the retrieved channel identifier of the selected URL. The wireless communication module 100 further connects to a wireless AP on the channel corresponding to the retrieved channel identifier of the selected URL to retrieve the type of the multimedia content corresponding to the selected URL from the multimedia server 30.

The processor 150 executes one or more computerized instructions for the wireless communication module 100, the display module 110, the user interface module 120, the parser module 130, and the switch module 140. The memory 160 stores the retrieved list of the URLs and the retrieved type of the multimedia content.

Figure 3:
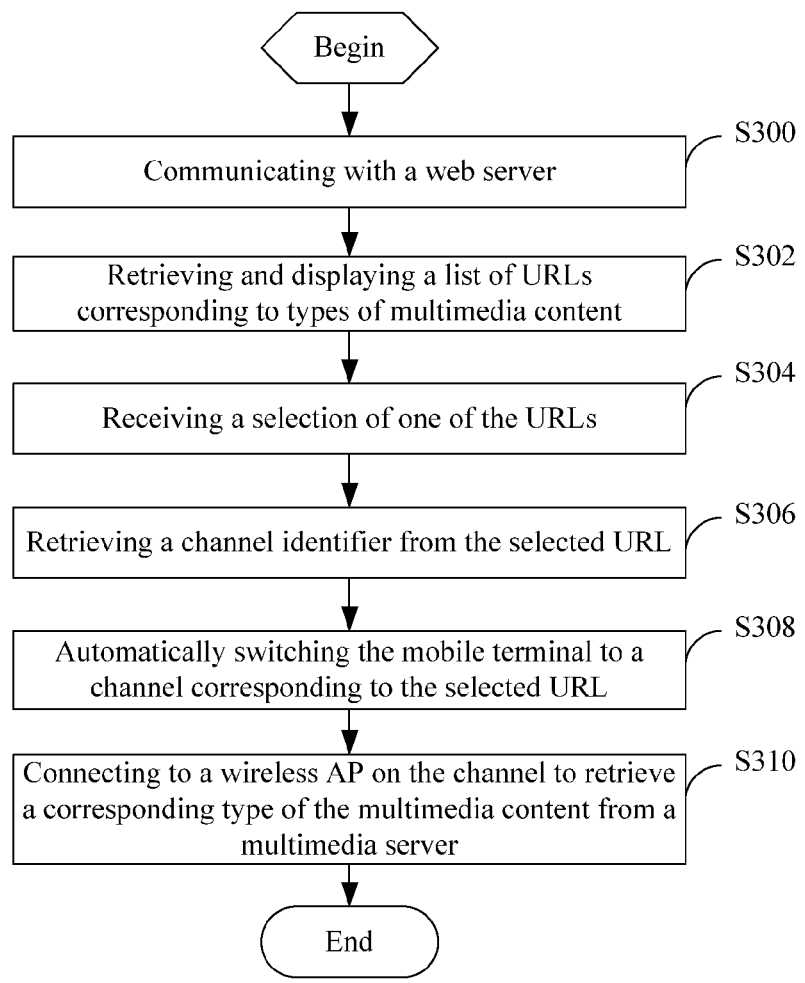
FIG. 3 is a flowchart illustrating an embodiment of a method for retrieving multimedia content as disclosed.

FIG. 3 is a flowchart illustrating an embodiment of a method for retrieving multimedia content as disclosed. The wireless APs of the WLAN 20 are connected to the multimedia server 30 and the web server 40, and the mobile terminal 10 needs to first connect to the wireless AP 2N on the Nth channel providing a data connection when entering the coverage area of the WLAN 20. In block S300, the mobile terminal 10 enters the coverage area of the WLAN 20, the wireless communication module 100 connects to the wireless AP 2N to communicate with the web server 40. In block S302, the wireless communication module 100 retrieves a list of the URLs corresponding to a type of the multimedia content from the web server 40, and the display module 110 displays the retrieved list of the URLs. As mentioned above, each of the URLs includes a channel identifier allocated to a corresponding type of the multimedia content. In one exemplary embodiment, the multimedia content stored in the web server 40 may include different athletics sportscast videos, such as, basketball sportscast video, track sportscast video, badminton sportscast video, and table tennis sportscast video. For example, if a URL of a basketball sportscast video is MDS:11//140.32.111.5/MLB/basketsportscast20021226, "11" is an identifier of a channel allocated to the basketball sportscast video.

If a user of the mobile terminal 10 wants to see the basketball sportscast video, he/she can tap the URL of MDS:11//140.32.111.5/MLB/basketballsportscast20021226 of the basketball sportscast video. In block S304, the user interface module 120 receives a selection of the URL of the basketball sportscast video. In block S306, the parser module 130 parses the selected URL, and retrieves a channel identifier of the selected URL of the basketball sportscast video, that is "11". In block S308, the switch module 140 automatically switches the mobile terminal 10 to the eleventh channel allocated to the basketball sportscast video.

In block S310, the wireless communication module 100 connects to a wireless AP 211 on the eleventh channel to retrieve the basketball sportscast video from the multimedia server 30, and the display module 110 displays the retrieved basketball sportscast video.

Because different types of the multimedia content is allocated to different channels, the mobile terminal 10 needs to roam to a channel allocated to the required type of the multimedia content, which avoids overload of the wireless APs 21 to 2N and improves traffic quality of the multimedia content.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A mobile terminal, connected to wireless access points (APs) in a wireless local area network (WLAN) to communicate with a multimedia server and a web server, the multimedia server storing multimedia content, the web server storing a list of uniform resource locators (URLs) corresponding to types of the multimedia content, the mobile terminal comprising:
   a wireless communication module, operable to connect to one of the wireless APs connected to the web server when the mobile terminal enters coverage area of the WLAN to communicate with the web server and to retrieve the list of the URLs from the web server, wherein each of the URLs comprises a channel identifier allocated to a corresponding type of the multimedia content;
   a display module, operable to display the list of the URLs retrieved by the wireless communication module;
   a user interface module, operable to receive a selection of one of the URLs;
   a parser module, operable to parse the selected URL and retrieve a channel identifier from the selected URL;
   a switch module, operable to automatically switch the mobile terminal to a channel corresponding to the retrieved channel identifier of the selected URL; and
   a processor, operable to execute one or more computerized instructions for the wireless communication module, the display module, the user interface module, the parser module and the switch module;
   wherein the wireless communication module further connects to a wireless AP on the channel corresponding to the retrieved channel identifier of the selected URL to retrieve a type of the multimedia content corresponding to the selected URL from the multimedia server.

2. The mobile terminal of claim 1, wherein the display module further displays the retrieved type of the multimedia content.

3. The mobile terminal of claim 1, further comprising a memory, operable to storing the retrieved list of the URLs and the retrieved type of the multimedia content.

4. A method for retrieving multimedia content, used in a mobile terminal, the method comprising:
   entering coverage area of a wireless local area network by the mobile terminal, and the mobile terminal connecting to a wireless access point (AP) to communicate with a web server;
   the mobile terminal retrieving and displaying a list of uniform resource locators (URLs) corresponding to types of multimedia content stored in a multimedia server, wherein each of the URLs comprises a channel identifier allocated to a corresponding type of the multimedia content;
   receiving a selection of one of the URLs;
   parsing the selected URL and retrieving a channel identifier from the selected URL;
   automatically switching the mobile terminal to a channel corresponding to the retrieved channel identifier of the selected URL; and
   connecting to a wireless AP on the channel corresponding to the retrieved channel identifier of the selected URL to retrieve a type of the multimedia content corresponding to the selected URL from the multimedia server.

5. The method for retrieving multimedia content of claim 4, further comprising displaying the retrieved type of the multimedia content onto a display.

\* \* \* \* \*